United States Patent
Dichter

(10) Patent No.: US 6,401,115 B1
(45) Date of Patent: Jun. 4, 2002

(54) PROGRAMMABLY CONFIGURABLE COMPUTER NETWORK

(75) Inventor: Carl R. Dichter, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 71 days.

(21) Appl. No.: 09/611,876

(22) Filed: Jul. 7, 2000

Related U.S. Application Data

(62) Division of application No. 09/119,370, filed on Jul. 20, 1998, now Pat. No. 6,216,160.

(51) Int. Cl.[7] .............................................. G06F 13/00
(52) U.S. Cl. ........................ 709/221; 709/224; 709/238; 709/250
(58) Field of Search ................................. 709/220, 221, 709/222, 223, 224, 230, 238, 246, 250

(56) References Cited

U.S. PATENT DOCUMENTS

| 5,084,870 A | * | 1/1992 | Hutchison et al. ........... 370/258 |
| 5,930,340 A | * | 7/1999 | Bell ......................... 379/93.08 |

* cited by examiner

Primary Examiner—Viet D. Vu
(74) Attorney, Agent, or Firm—Trop, Pruner & Hu, P.C.

(57) ABSTRACT

A programmably configurable computer network, particularly applicable to small network applications such as home networks, includes a plurality of nodes which may be implemented through wall-box sized components. The nodes may be connected through telephone wires and may also offer telephone connectors at each node. The system may be powered by a high frequency power supply which is isolated from the external telephone system using a low pass filter. In this way, the network can be automatically configured to achieve an efficient and specification compliant topology without requiring rewiring of the building.

8 Claims, 6 Drawing Sheets

PROGRAMMABLY CONFIGURABLE COMPUTER NETWORK

This is a divisional of prior application Ser. No. 09/119,370 filed Jul. 20 1998, now U.S. Pat. No. 6,216,160.

BACKGROUND

This invention relates generally to computer networks and particularly to networks with a relatively small number of nodes.

Computer networks connect computers and other devices together so that various computers on the network can share files, programs and resources. For example, it may be desirable to centralize files on one computer and allow access through the network from other computers. In addition, it may be desirable to share resources such as a printer wish a number of computers. All of these functions can be achieved through computer networks. As a result of the advantages of computer networks, home computer networks are becoming more prevalent. Many homes have more than one computer and, for the reasons described above, many users would like to share resources and files among those computers.

Today, some builders provide houses which are pre-wired for such computer network connections. The homeowner merely plugs in the various components into pre-wired wall jacks. However, these pre-wired connections tend to be cost prohibitive for most homeowners.

Networks generally come in two basic types. The most common type uses twisted pair cables and includes what is known as a network hub. The hub includes a plurality of cable connectors so that each computer on the network may be connected to the hub. Some networks use coaxial cables where the cable goes directly from computer to computer without using a network hub.

The Ethernet is a standardized way of connecting computers into a network. The standards for the Ethernet are set forth in the Institute of Electrical and Electronics Engineers (New York, N.Y.) IEEE 802.3 standard. Most common Ethernet systems today transmit data at a rate of 10 million bits per second. A newer Ethernet version called Fast Ethernet has a bandwidth of 100 million bits per second and is sometimes referred to as 100 BaseT. The 10 million bits per second networks are generally called 10 BaseT when twisted pair cabling is utilized.

A popular network cable is unshielded twisted pair cable (UTP). Generally, UTP cable connects the Ethernet network by coupling the computers in a star arrangement. At the center of the star is the hub. UTP cable is generally connected to various devices such as computers through UTP connectors called RJ-45connectors. The RJ-45connectors are similar to the plug-in connectors used to connect telephones (which are called RJ-11connectors).

There are a variety of rules for Ethernet connections compliant wish the IEEE standard. One of the basic rules s that there may not be more than three hops. A hoc is a connection from one device to another. In addition, there are rules with respect to the maximum length of cable. For 10BaseT cable, the maximum length is generally 100 meters. This normally means that about 90 meter runs may be used between nodes assuming 10 meter cables are used to connect a computer or other device to an RJ-45connector.

While network technology has been applied widely to larger businesses, the cost has been prohibitive in many cases as applied to home and small business applications. A large component of the cost associated with home networks is the need to rewire existing homes to provide the Ethernet connections. Normally, this involves using UTP cabling and RJ-45 connectors to provide a plurality of connection points in different rooms of the house. These connection points are then wired together using the UTP cable to form the network. Usually, in a 10BaseT system, the network would also include a hub.

For existing homes, the wiring expense alone is prohibitive, and even for new homes, the expense is sufficiently great that new homes commonly do not include network wiring.

Thus, there is a continuing need for a network system that avoids the need for extensive rewiring or special network wiring.

SUMMARY

In accordance with one aspect, a computer network includes a plurality of nodes. A programmable switching network allows the nodes to be connected in a plurality of different ways.

In accordance with another aspect, a computer network includes a plurality of nodes connected to telephone lines. Telephone wires connect the various nodes to one another. A high frequency power supply for the nodes is connected to those telephone wires. However, a filter is arranged to isolate the network power supply from the external telephone service.

DETAILED DESCRIPTION

Figure 1:
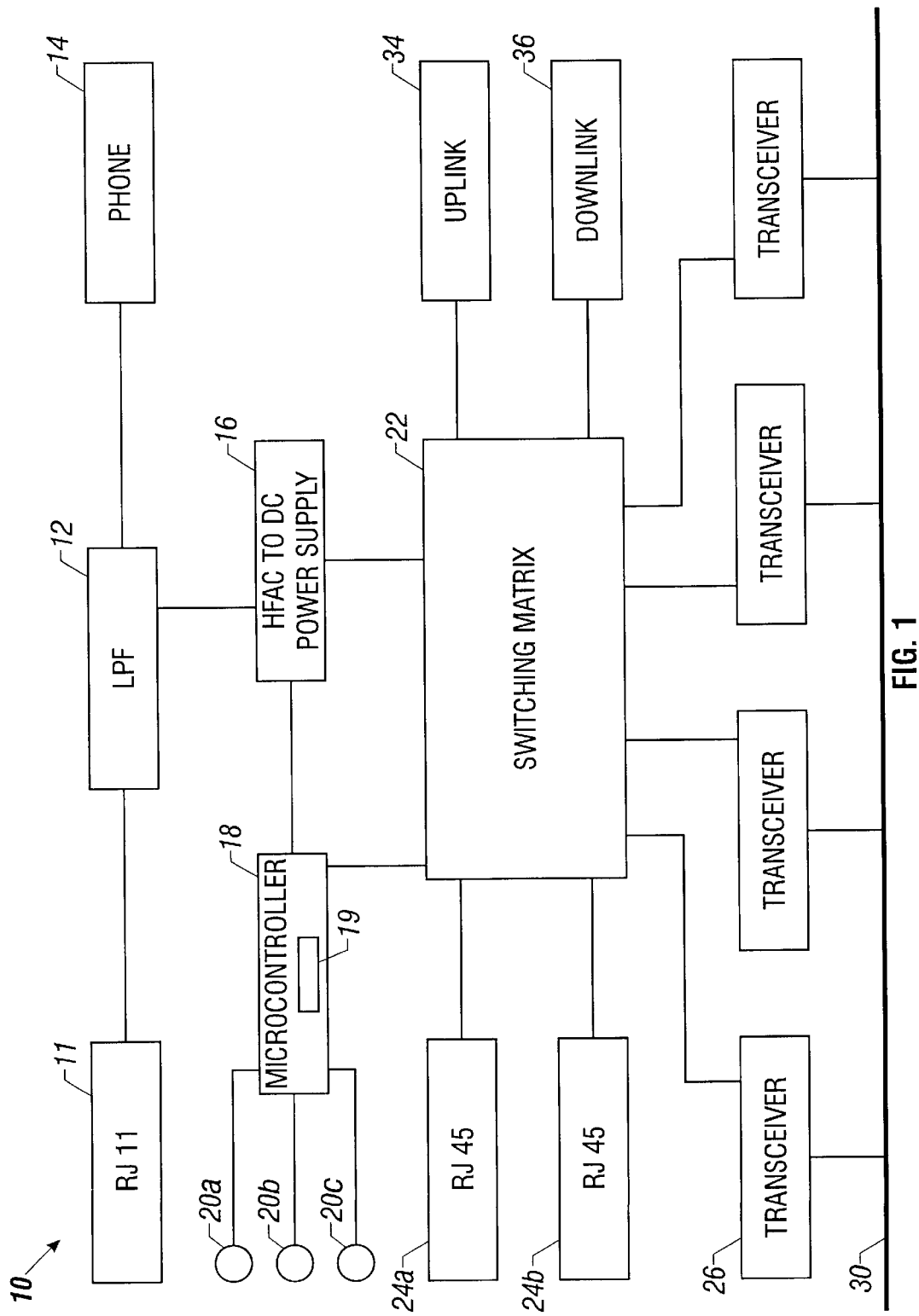
FIG. 1 is a block diagram of one embodiment of a node in accordance with one embodiment of the present invention.

A programmably configurable node 10, shown in FIG. 1, for a computer network includes network connectors 24a and 24b and a telephone connector 11. The network connectors 24 may be conventional RJ-45connectors used in a UTP system. The telephone connector 11 connects to the phone line 14 through a low pass filter 12.

The low pass filter 12 prevents the high frequency signal that is developed by the power supply 16 from affecting telephone equipment. The power supply provides a DC signal for the microcontroller 18 and the analog switching matrix 22. Only one node 10 needs to be connected to system power as illustrated in FIG. 1. The other nodes may receive power through the node connected to system power.

The microcontroller 18 controls an analog switching matrix 22 which is connected to the network uplink pair 34 and the network downlink pair 36. These pairs may also be referred to as the receive (R+, R−) and transmit (T+, T−) pairs. Switching matrix 22 also connects the network connectors 24a and 24b which, in the illustrated embodiment, are RJ-45connectors. The microcontroller 18 drives a plurality of indicators 20 associated with each of the connectors 11 and 24 to indicate their status. Additional indicators can be provided as well. The switching network 22 may also connect to a plurality of transceivers 26 which in turn are coupled by a bus 30.

The microcontroller 18 controls the configuration of the switching matrix 22 to provide a programmably configurable node. The node may be configured, for example, as a pass through node which simply passes any information it receives on to the next node in the network. In such case, the transceivers 26 are not utilized.

The switching matrix 22 may, however, configure the transceivers 26 to provide a plurality of programmable ports 10. For example, through the transceivers 26, the node 10 may act as a hub. A plurality of devices can be connected through the transceivers 26 as desired.

Figure 2:
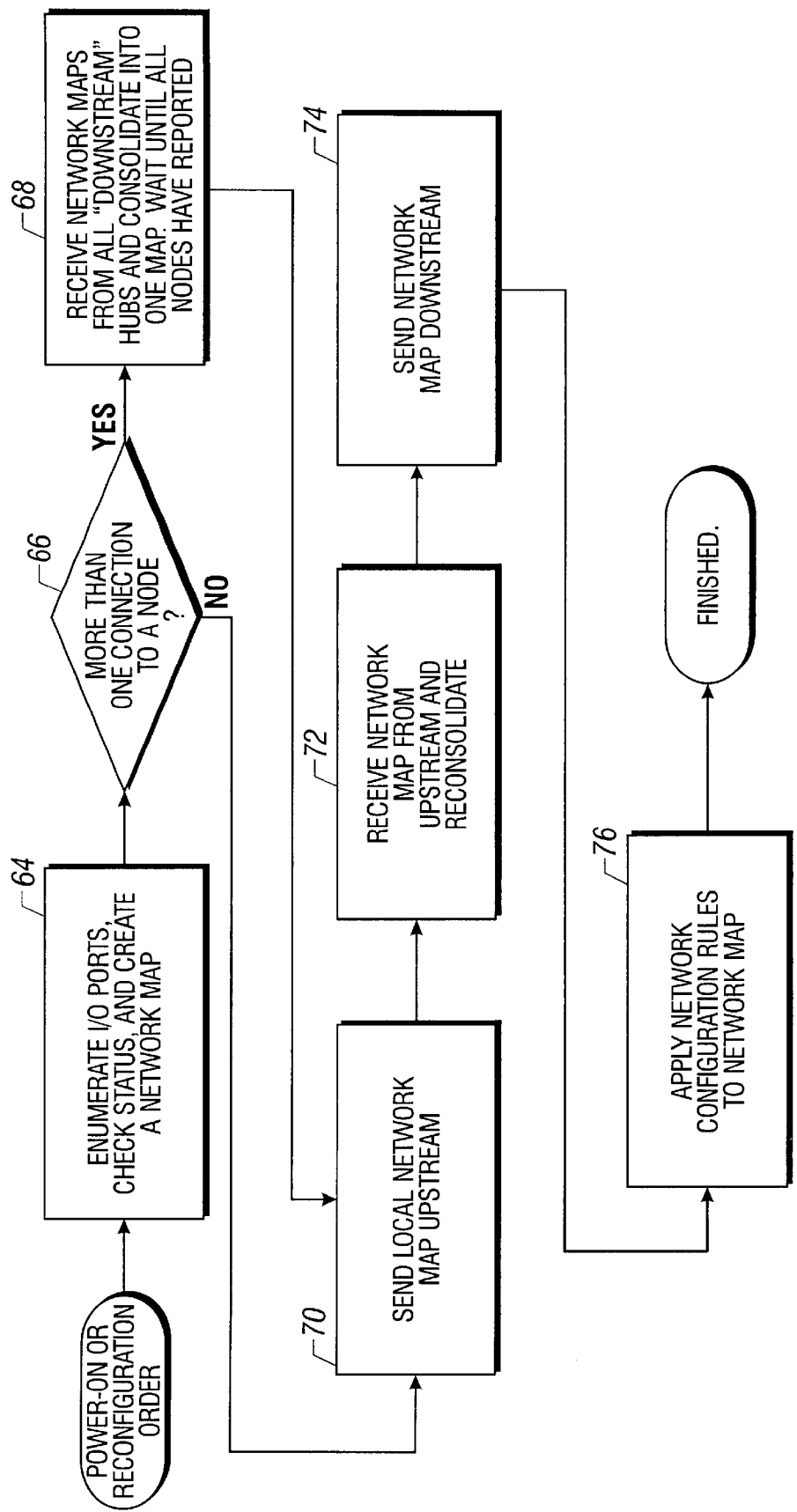
FIG. 2 is a flow diagram for the power-up sequence for the microcontroller shown in FIG. 1.

Referring to FIG. 2, upon power-on or after a reconfiguration order to the node 10, the node 10 checks each transceiver 26 port, checks its status and creates a network map, as indicated in block 64. Next, a check is made to determine whether there is more than one connection to the node, as indicated in diamond 66. If so, the network maps from all downstream nodes are collected and consolidated into one map, as indicated in block 68. The flow waits until all other nodes have reported. The node only sends its local network map upstream, as indicated at block 66. Otherwise the node receives maps from downstream nodes and only then sends its map to upstream nodes.

In block 72, the node receives upstream network maps, which the node consolidates. The consolidated map is then sent downstream (block 74). The appropriate network configuration rules are then applied to the network map as shown in block 76. The rules could implement, for example, the IEEE 802.3 standard.

Generally, all of the nodes apply the same rules and should deduce the same configuration for the network. However, in some cases, it may be desirable to denominate one microcontroller in one hub as the master and other microcontroller in other hubs as slaves to that master.

The simple network management protocol (SNMP) may enable various hubs to be interrogated as to their current condition and the condition of any resources connected to those hubs. The SNMP describes how information is exchanged those hubs. The SNMP describes how information is exchanged between various network devices. Thus, not only may devices connected to a given hub have their status evaluated, but hub-to-hub status evaluations may be accomplished as well.

Figure 3:
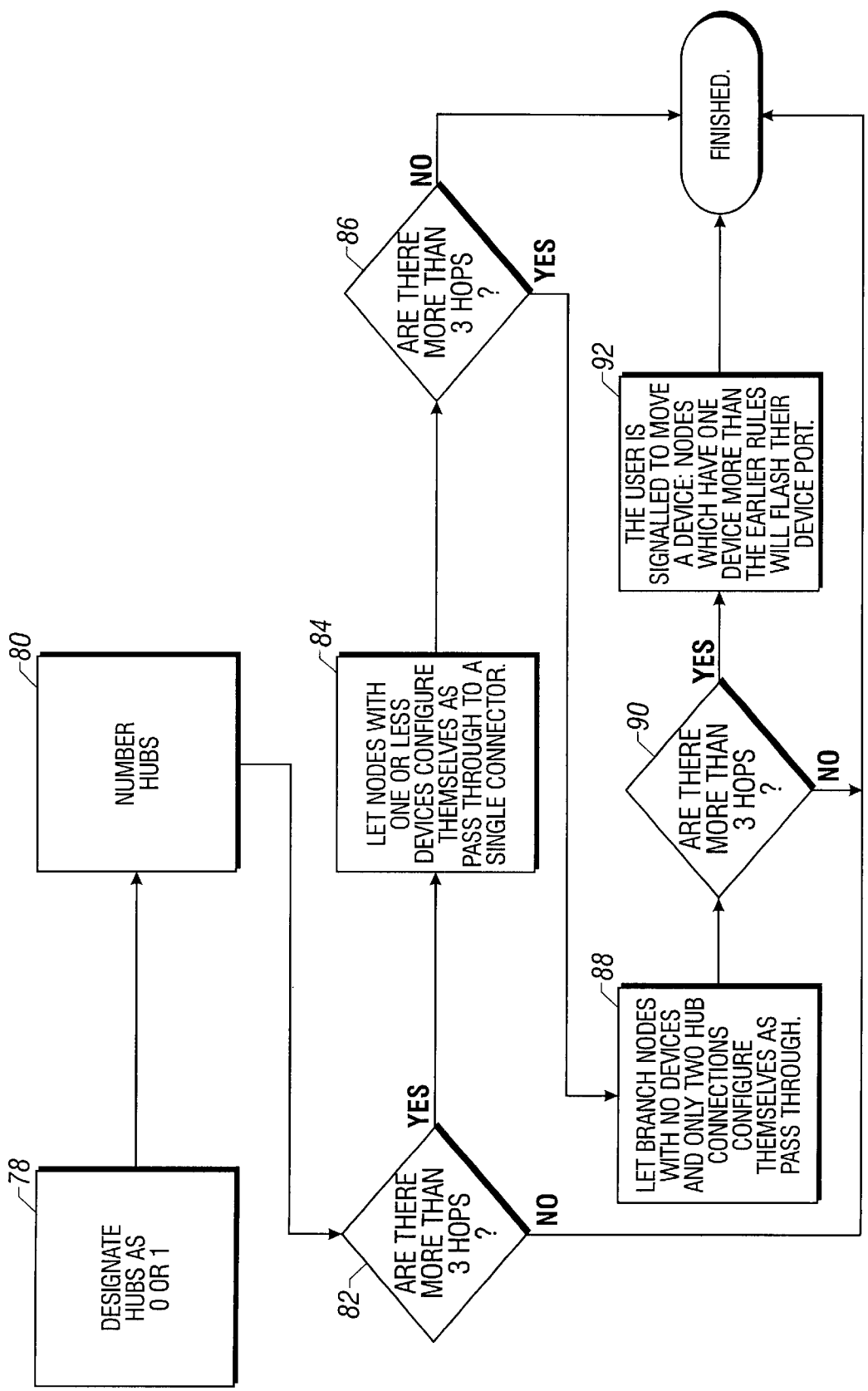
FIG. 3 is a flow diagram for implementing network configuration rules for the microcontroller shown in FIG. 1.

The network configuration rules may be implemented using the flow shown in FIG. 3. All nodes except the one with system power may initially be enumerated as #0, while the node with system power is enumerated as #1, as indicated in block 78. In the consolidated maps (FIG. 2, block 72), the nodes are numbered successively extending away from the system hub, as indicated in block 80. Priority is given to the nodes on the lowest numbered local port. Next a check is made (diamond 82) to determine if there are more than three hops. If not, the configuration is complete.

If there are more than three hops, the number of hops must be reduced to three. A first attempt to resolve the excessive number of hops is to let nodes with one or less devices configure themselves as a pass through to a single connector (block 84). A check is made at diamond 86 to see if the number of hops still exceeds three. If not the configuration is complete.

Otherwise, the flow lets the nodes with no devices and only two node connections configure themselves as a pass through, as shown in block 88. Again a check is made, this time a diamond 90, to see if the three hop rule is still violated. If not the configuration is complete.

Otherwise, the user is signaled to move a device. Nodes which have one device more than the other nodes indicate by flashing an indicator associated with their device ports (block 92). network map. Thus all the nodes know what changes must be made to all the other nodes.

Figure 5:
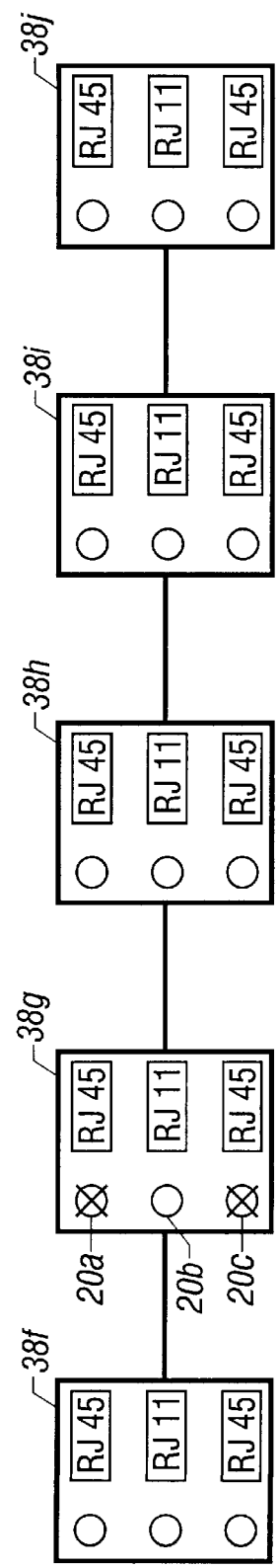
FIG. 5 shows another exemplary connection between a plurality of nodes in accordance with one embodiment of the present invention.

Referring now to FIG. 5, a plurality of nodes 38 are connected together in the exemplary fashion shown in FIG. 2. The nodes 38 are connected to one another using conventional telephone cabling. Conventional telephone cable used in homes includes four wire pairs. These wire pairs may be utilized to provide two telephone lines and two lines for providing network interconnections in an in-home system. The illustrated embodiment uses the Ethernet 10BaseT system.

Figure 4:
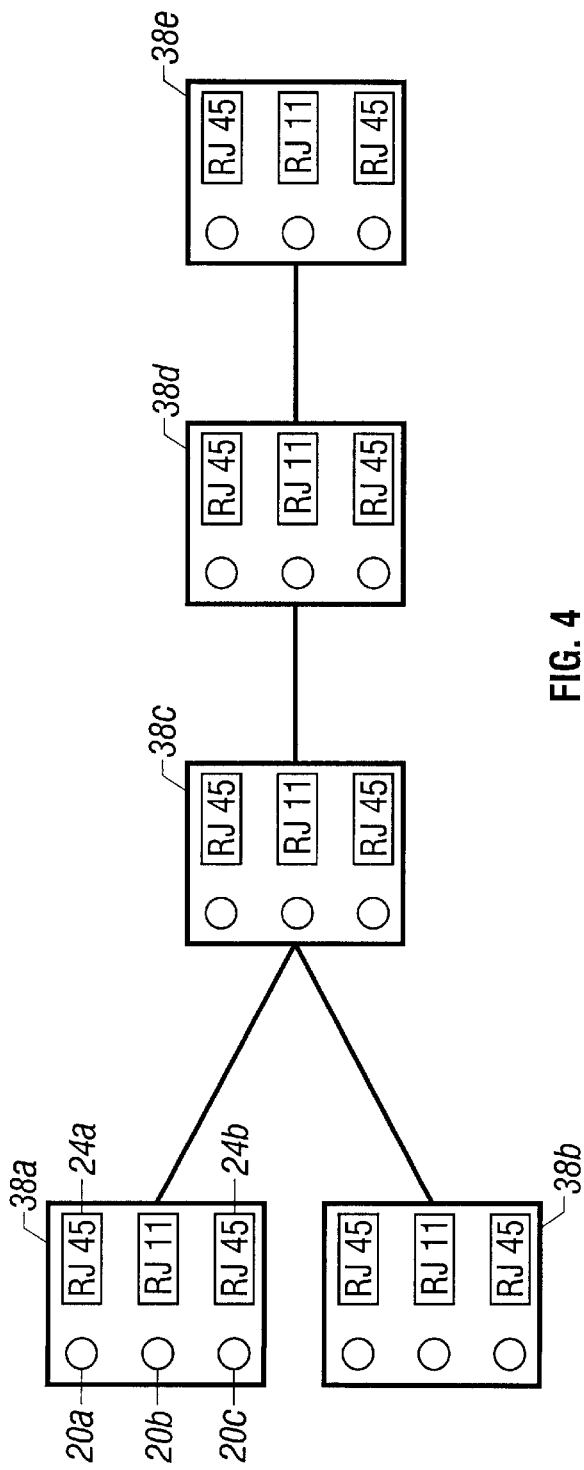
FIG. 4 shows an exemplary connection between a plurality of nodes in accordance with one aspect of the present invention.

In the configuration shown in FIG. 4, a node 38c has configured itself with one upload port and four standard ports. The node 38d has configured itself with one upload pore and three standard ports through the appropriate programming of the transceivers 26. The nodes 38a, 38b and 38e are all configured as one upload and two standard ports. Thus, the wiring connections may be dynamically configurable based on the needs of the system and the rules of the appropriate network such as the IEEE 802.3 standard. These rules may be stored in the memory 19 of the microcontroller 18.

Referring next to FIG. 5, a network consisting of nodes 38f through 38j are connected in a generally linear fashion. The network is wired with five outlets in series. Since the node 38g does not have computers attached to it, it has configured itself as a pass through node in order not to exceed the 10BaseT hop limits. As indicated by the indicators 20a and 20c, the network connections of the node 38g have been deactivated. 38g have been deactivated.

Figure 6:
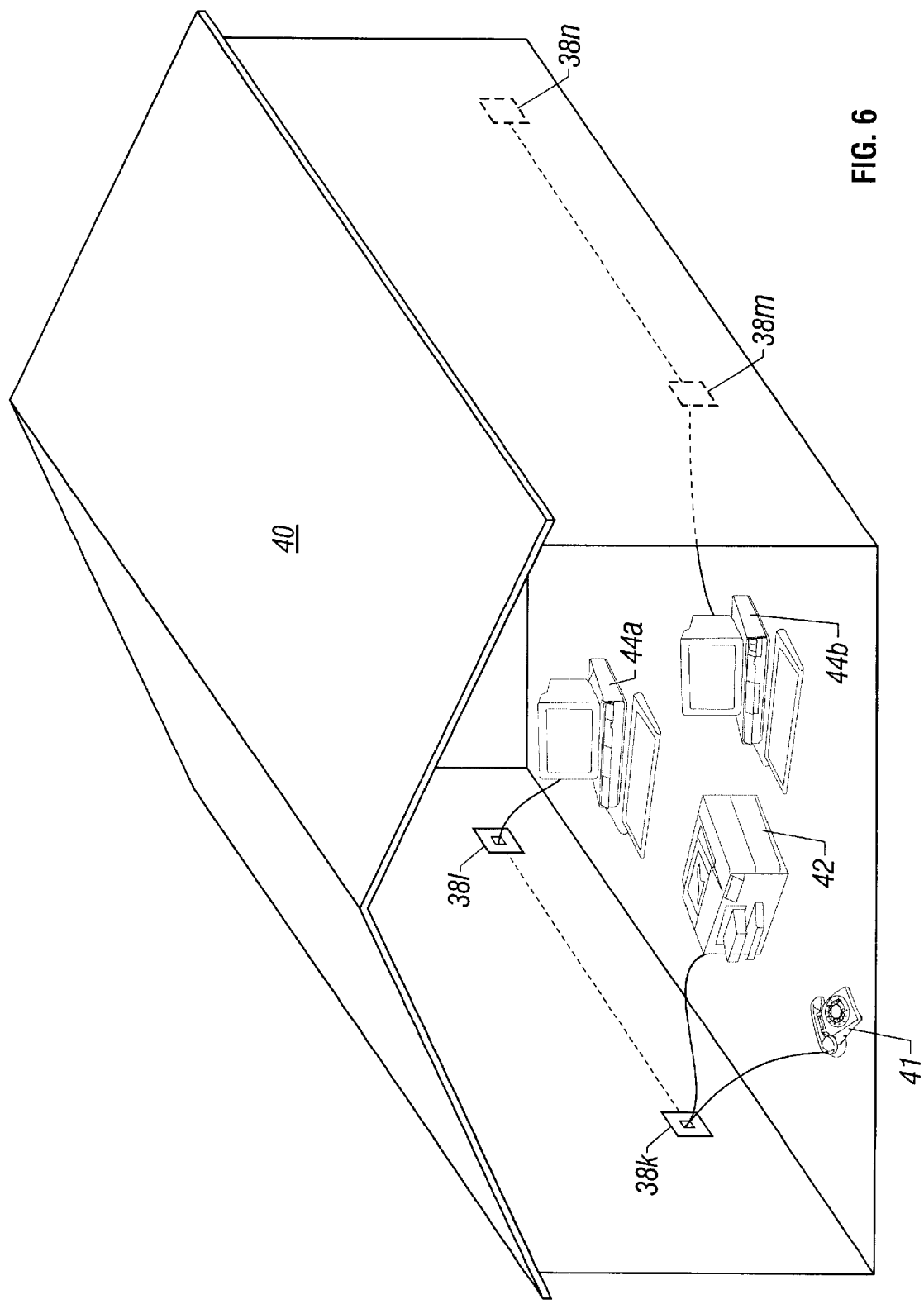
FIG. 6 shows a perspective view of a cutaway building snowing the connections to a plurality of devices connected by a network in accordance with one aspect of the present invention.

A house 40 may be provided with a network shown in FIG. 6, using a plurality of nodes 38k through 38n. Each of these nodes may be formed by the circuitry shown in FIG. 1 within a standard wall electrical box. In the illustrated embodiment, a telephone 41 is connected to the node 38k together with a printer 42. Computers 44a and 44b are connected to the nodes 38l and 38m respectively.

Figure 7:
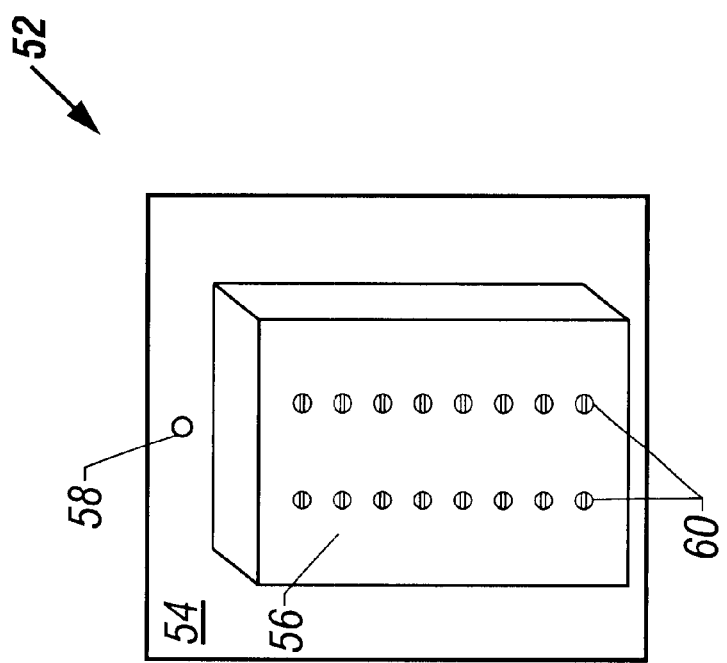
FIG. 7 is a perspective view of the rear of a connector plate implementing the node shown in FIG. 1.

A box unit 52, illustrated in FIG. 7, for housing a node 38, includes a cover plate 54 and a housing 56. The housing 56 contains the circuitry shown in FIG. 1 and provides a plurality of connections 60 to the telephone pairs. The cover plate 54 also includes an opening 58 for securing the box 52 to the wall.

Figure 8:
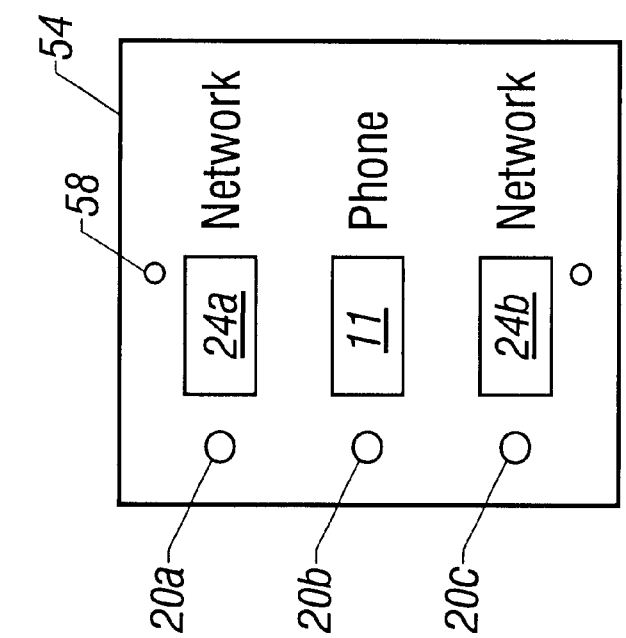
FIG. 8 is a front elevational view of the connector plate shown in FIG. 5.

After the appropriate connections have been made to the telephone pairs, the box 52 is secured to the wall using standard fasteners in the opening 58 so that the cover plate 54 faces outwardly, as illustrated in FIG. 8. The cover plate 54 then provides two network connection plugs, 24a and 24b, and a telephone connection plug 11. These connection plugs may be labeled as indicated to prevent confusion. Indicators 20a, 20b, and 20c, which may be conventional light emitting diodes (LED), may be provided to give status information with respect to each of the connectors 24 or 11.

Each node 10 may also include packet regeneration, automatic polarity detection/correction and the IEEE defined link integrity test function which continually monitors the receive pair to assure link continuity. In addition, each node may include segment partitioning and jabber lock-up protection.

Using as few as three phone line pairs, two to four local area network (LAN) devices may be connected using standard connectors. The nodes do not require any local power supply. Instead, they are supplied with operating power from a high frequency signal applied to the primary phone line either at the phone junction box, at one of the nodes, or within the wall. The power supply may be isolated from the telephone company lines at the utility box via a low-pass filter.

Through the use of the microcontrollers 18, the network can be automatically configured to achieve the most desirable topology consistent with the applicable standards. When power is supplied, each node communicates with each adjacent node to develop a connection topology. Then, the nodes plan a topology which meets the restrictions of any applicable standards. Each node can configure itself as a pass through, repeater or hub. Further, each port on each node can be configured as a standard uplink or pass through port as well as reconfiguring its polarity.

Although the present invention has been described with respect to a 10BaseT system, the concepts set forth herein are also applicable to other network connections and to higher throughput Ethernet connections as well.

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A computer network comprising:
   a plurality of nodes, each node including circuitry to determine a map of the entire network; and
   a programmable switching network to allow said nodes to be constructed in a plurality of different ways.

2. The network of claim 1 wherein said switching network is selectively able to allow a node to be connected either as a pass through node or as a non-pass through node.

3. The network of claim 1 wherein said nodes are connected by telephone wires.

4. The network of claim 3 including a device that produces a high frequency signal for said network and a low pass filter to prevent said high frequency signal from interfering with telephone service.

5. The network of claim 1 including a microcontroller, a plurality of transceivers, and a switching matrix, said switching matrix selectively connectable to a transceiver or an uplink pair and a downlink pair.

6. The network of claim 1 wherein a plurality of nodes are adapted to determine what devices are connected to the nodes and to convey this information to other nodes.

7. The network of claim 1 wherein at least one of said nodes includes a memory containing network configuration rules.

8. The network of claim 7 including a device for ensuring that the network is automatically reconfigured the network does not comply with said rules.

* * * * *

UNITED STATES PATENT AND TRADEMARK OFFICE
CERTIFICATE OF CORRECTION

PATENT NO. : 6,401,115 B1
DATED : June 4, 2002
INVENTOR(S) : Carl R. Dichter

It is certified that error appears in the above-identified patent and that said Letters Patent is hereby corrected as shown below:

Column 6,
Line 31, after "reconfigured" insert -- if --.

Signed and Sealed this

Twentieth Day of August, 2002

Attest:

JAMES E. ROGAN
Attesting Officer    Director of the United States Patent and Trademark Office